March 13, 1951      G. KESSLER      2,545,286

PROCESS FOR MAKING LAMINATED WOOD PRODUCTS

Filed Dec. 22, 1945

INVENTOR

GEORGE KESSLER

By Alfred W. Petchaft

ATTORNEY

Patented Mar. 13, 1951

2,545,286

UNITED STATES PATENT OFFICE 2,545,286

PROCESS FOR MAKING LAMINATED WOOD PRODUCTS

George Kessler, St. Louis, Mo.

Application December 22, 1945, Serial No. 636,923

5 Claims. (Cl. 154—121)

This invention relates in general to certain new and useful improvements in laminated wood products and processes for the manufacturing thereof.

It is the primary object of the present invention to provide a simple and economical laminated material having inlaid artistic designs which are sharply delineated and firmly held in place.

It is a further object of the present invention to provide a method of making laminated products of the type above stated, which method is simple, economical, speedy, and results in an extremely satisfactory, strong, and artistic product.

And with the above and other objects in view, my invention resides in the novel features of form, construction, arrangement, and combination of parts presently described and pointed out in the claims.

In the accompanying drawing—

Figure 2:
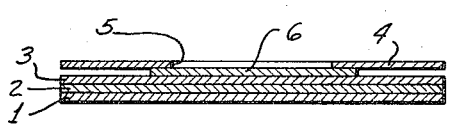
Figure 2 is a sectional view of the plies prior to compression.

Referring now in more detail and by reference characters to the drawing, the present invention comprises the provision of a plurality of plies or veneers formed preferably of wood of relatively small thickness, each ply or veneer being impregnated with a suitable laminating plastic, such as a clear vinyl or methacrylate resin, for example. If it is desired to make a four-ply board or panel, three identically shaped underlying plies 1, 2, 3, of the type above described are superimposed. A fourth or top ply 4, also of plastic impregnated wood, is provided, by stamping or any other suitable process, with a cut-out design, such as the letter "K," for instance, as indicated at 5. A thin piece of metal foil 6 having a preferably rectangular outline or contour substantially greater than the overall area occupied by the design 5 is placed between the plies 3 and 4 in more or less symmetrical underlying relationship beneath the design, as shown in Figure 2. If desired, a plurality of smaller overlapping pieces of foil may be used to cover the requisite area instead of a single unitary piece.

Figure 3:
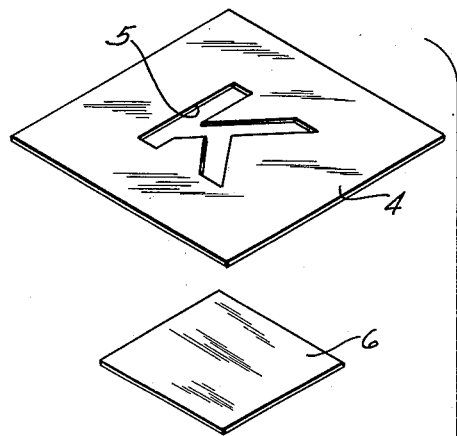
Figure 3 is a top plan view of an inlaid laminated section constructed in accordance with the present invention.
Figure 3:
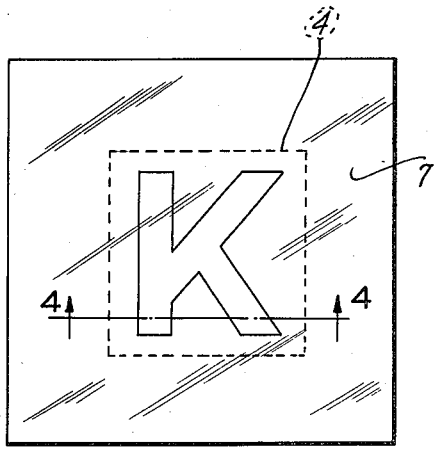
Figure 4:
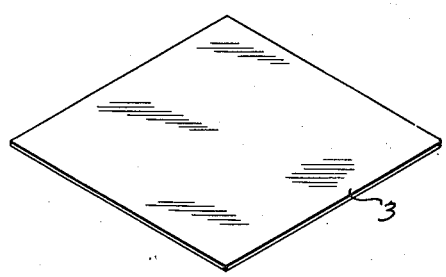
Figure 4 is a vertical sectional view taken along the line 4—4 of Figure 3.
Figure 4:
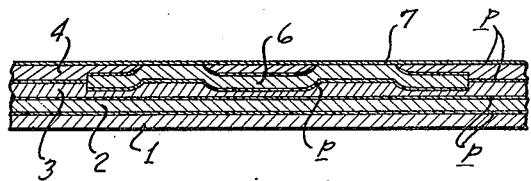
Figure 1:
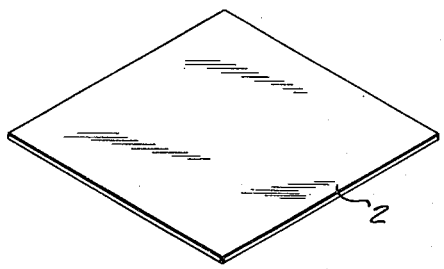
Figure 1 is an exploded view of the several component plies or laminations which are assembled to form the product of the present invention.
Figure 5:
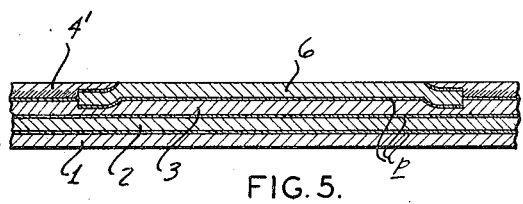
Figure 5 is a sectional view of a modified form of laminated product made in accordance with the present invention.
Figure 6:
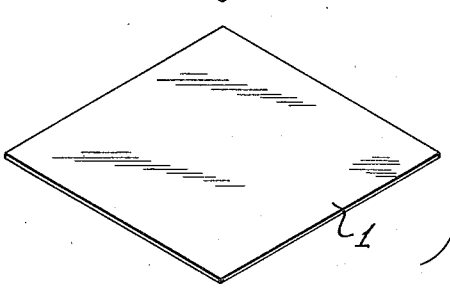
Figure 6 is a vertical sectional view of a further modified form of laminated product made in accordance with the present invention.
Figure 6:
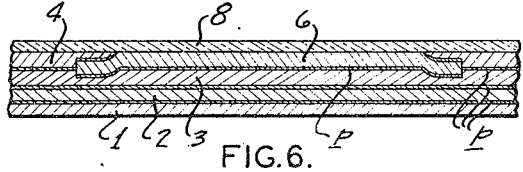

The assembled plies are then placed in a hydraulic press having a heated die and subjected to a gradually increasing pressure up to a thousand pounds per square inch. Under the influence of both heat and pressure, the laminating resin will be rendered plastic and will form adhesive layers $p$ between the several plies. The plies, furthermore, will be compressed to a fraction of their original thickness. In the process of compression, the metal foil 6 will be forced up through the open portions of the design 5, completely and snugly filling it to produce a resultant inlay level with the top face of the uppermost ply 4, substantially as shown in Figures 3 and 4.

As has been stated, each of the plies will be compressed and thereby reduced to thickness, so that the overall thickness of the resulting product will be substantially smaller than the combined height of the uncompressed assembled plies. Furthermore, the plastic resin will exude from the pores adjacent the upper face of the top ply 4 and produce a thin overall clear film 7, which results in an extremely pleasing, durable, and satisfactory surface finish.

If desired, I may provide a modified form of laminated product in which the uppermost ply 4' is impregnated with plastic resin only for a portion of its thickness, so that its top or exposed face and the portion lying immediately therebelow is unimpregnated. When compressed, the plastic resin will not exude from the upper face and the resulting product will have an uncoated or so-called "natural" top surface which may be polished by any conventional wood finishing or furniture finishing methods to a fine natural surface and either waxed, shellacked, varnished, or, if desired, left untreated. The foil forming the inlay will, of course, be flush upon its top face with the top face of the section 4' and will fill the marginal crevices and indentations thereof smoothly and tightly, so as to form a perfect inlay.

If desired, I may also provide a further modified form of laminated product, which is substantially similar to the product shown in Figures 1 to 4, inclusive, except that an additional overlying or top surface sheet 8 of clear transparent plastic is placed over the top face of the uppermost ply 4 and is laminated thereto as a part of the entire structure.

If desired, plastic sheet material or foil-like elements or thin sheets of wood of contrasting color or grain may be substituted for the above described metal foil, and it should be understood that other similar changes and modifications in the form, construction, arrangement, and combination of the several parts of the laminated product and in the steps of its production may be made and substituted for those herein shown and described without departing from the nature and principle of my invention.

Having thus described my invention, what I claim and desire to secure by Letters Patent is:

1. The method of preparing an inlaid laminated sheet which comprises superimposing a plurality of wood plies impregnated with thermoplastic material, the uppermost ply of which is provided with a stamped out design-defining aperture, interposing a sheet of metal foil beneath the said aperture and the directly underlying ply, subjecting the plies and interposed foil to heat and pressure for simultaneously compressing and laminating them, and forcing the metal foil upwardly to fill the design-defining aperture.

2. The method of preparing an inlaid laminated sheet which comprises superimposing a plurality of wood plies impregnated with thermoplastic material, the uppermost ply of which is provided with a stamped out design-defining aperture, interposing a sheet of metal foil beneath the said aperture and the directly underlying ply, subjecting the plies and interposed foil to heat and pressure for simultaneously compressing and laminating them, and forcing the metal foil upwardly to fill the design-defining aperture.

3. The process of manufacturing an inlaid sheet which comprises providing a thermoplastic impregnated wood base, providing a top wood ply having a design-defining aperture stamped therethrough, said top ply being impregnated with thermoplastic for only a part of its distance inwardly from its under face, interposing a sheet of metal foil between the base and the top ply in the area of the design-defining aperture, and subjecting said base, top ply, and interposed sheet to heat and pressure for laminating them together in a unitary structure and at the same time causing the metal foil to fill the design-defining aperture.

4. The method of preparing an inlaid laminated sheet which comprises superimposing a plurality of thin wood plies impregnated with vinyl resin, the uppermost ply of which is provided with a stamped out design-defining aperture, interposing a sheet of metal foil beneath the said aperture and the directly underlying ply, subjecting the plies and the interposed metal foil to heat and gradually increasing pressure for simultaneously compressing said plies and laminating said plies and said sheet of metal foil, whereupon said metal foil is forced upwardly to fill the design defining aperture so that the uppermost surface of the metal foil is flush with the upper surface of the uppermost ply.

5. The method of preparing an inlaid laminated sheet which comprises superimposing a plurality of thin wood plies impregnated with methacrylate resin, the uppermost ply of which is provided with a stamped out design-defining aperture, interposing a sheet of metal foil beneath the said aperture and the directly underlying ply, subjecting the plies and the interposed metal foil to heat and gradually increasing pressure for simultaneously compressing said plies and laminating said plies and said sheet of metal foil, whereupon said metal foil is forced upwardly to fill the design defining aperture so that the uppermost surface of the metal foil is flush with the upper surface of the uppermost ply.

GEORGE KESSLER.

REFERENCES CITED

The following references are of record in the file of this patent:

UNITED STATES PATENTS

| Number | Name | Date |
| --- | --- | --- |
| 272,033 | Edge | Feb. 13, 1883 |
| 657,217 | Heeren | Sept. 4, 1900 |
| 1,597,539 | Novotny | Aug. 24, 1926 |
| 1,804,508 | Nicholson | May 12, 1931 |
| 1,852,002 | Clark | Apr. 5, 1932 |
| 2,003,494 | Reynolds | June 4, 1935 |
| 2,031,474 | Frank | Feb. 18, 1936 |
| 2,126,711 | Atwood | Aug. 16, 1938 |
| 2,232,762 | Batcheller | Feb. 25, 1941 |
| 2,275,290 | Dreyer | Mar. 3, 1942 |

OTHER REFERENCES

Hackh's Chemical Dictionary, Third edition, published 1944 by The Blakiston Co., Philadelphia, Pa., page 664. (Copy available in Division 20.)